(12) United States Patent
Tseng

(10) Patent No.: US 7,463,716 B2
(45) Date of Patent: Dec. 9, 2008

(54) LINEAR X-RAY DETECTOR USING ROD LENS ARRAY

(75) Inventor: Hsin-Fu Tseng, Los Altos, CA (US)

(73) Assignee: X-Scan Imaging Corporation, San Jose, CA (US)

( * ) Notice: Subject to any disclaimer, the term of this patent is extended or adjusted under 35 U.S.C. 154(b) by 104 days.

(21) Appl. No.: 11/499,166

(22) Filed: Aug. 4, 2006

(65) Prior Publication Data

US 2008/0031418 A1 Feb. 7, 2008

(51) Int. Cl.
*G01T 1/24* (2006.01)
(52) U.S. Cl. .................. 378/98.8; 250/370.09
(58) Field of Classification Search ........... 378/98.8, 378/19, 189; 250/370.09, 370.11, 370.14
See application file for complete search history.

(56) References Cited

U.S. PATENT DOCUMENTS 4,987,307 A * 1/1991 Rizzo et al. ............... 250/368

2007/0145282 A1 * 6/2007 Campbell ............... 250/370.11

* cited by examiner

*Primary Examiner*—Hoon Song
(74) *Attorney, Agent, or Firm*—The Kline Law Firm

(57) ABSTRACT

A radiation damage resistant linear X-ray detector array system based on a unique focusing principle reduces or eliminates the X-ray radiation damage on the electrical components of the detector system. The system includes a layer of scintillating material, a rod lens array, and an array of image sensors. The layer of scintillating material, such as $Gd_2O_2S$:Tb (GOS or GADOX), CsI(Tl), or $CdWO_4$, is placed on an image plane and used to convert the impinging X-ray energies into visible light which can be detected efficiently by the image sensor array. The rod lens array is used to focus the visible light after the X-ray flux has been converted. The photon energy of the visible light is collected with a scanning image sensor array that converts the photon energy proportionally into electrical video signals and enables the signals to be processed using standard signal and image processing software and equipment.

12 Claims, 9 Drawing Sheets

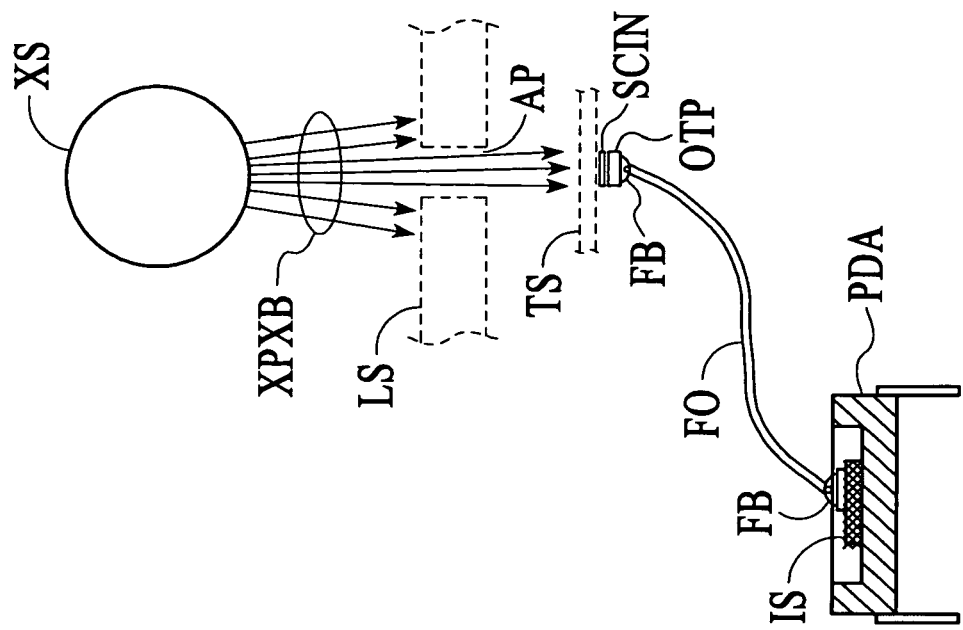
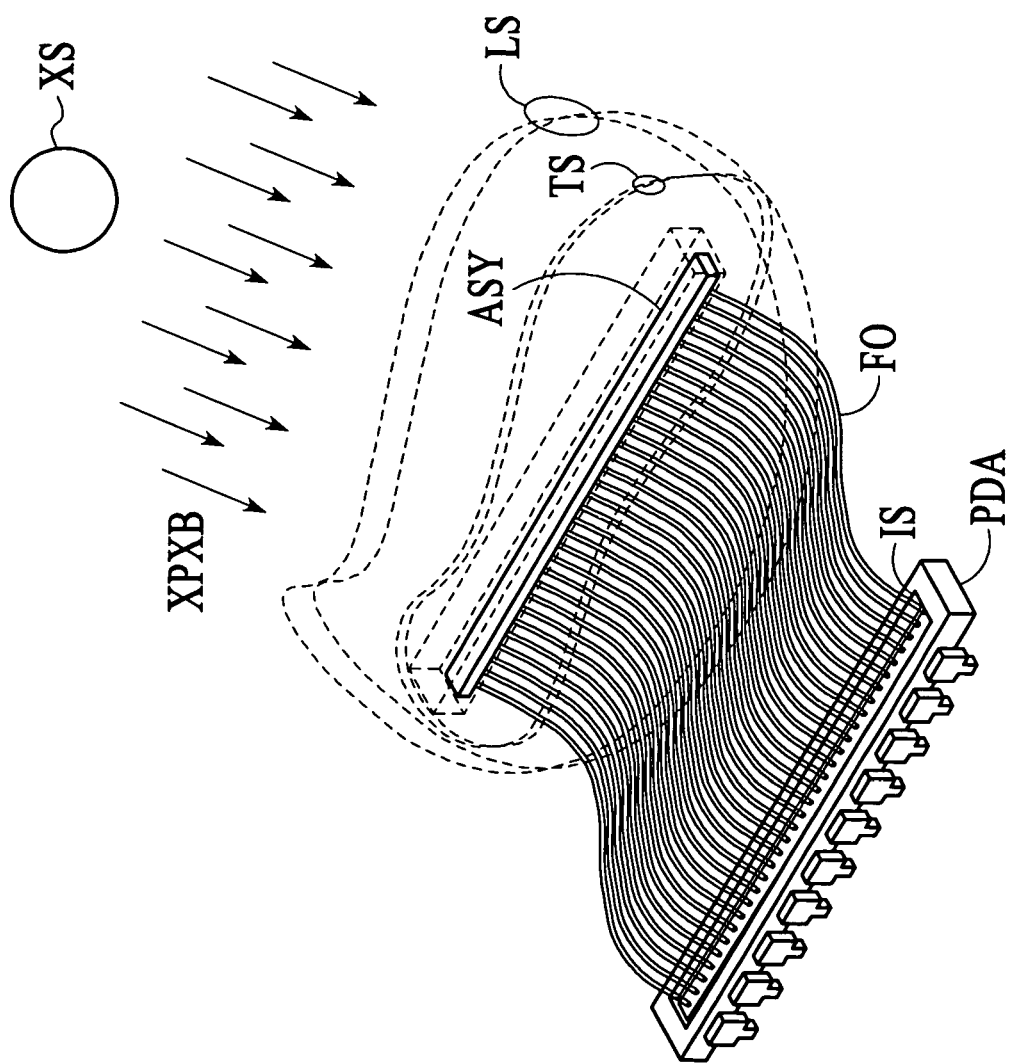
FIG. 3B (PRIOR ART)
FIG. 3A (PRIOR ART)

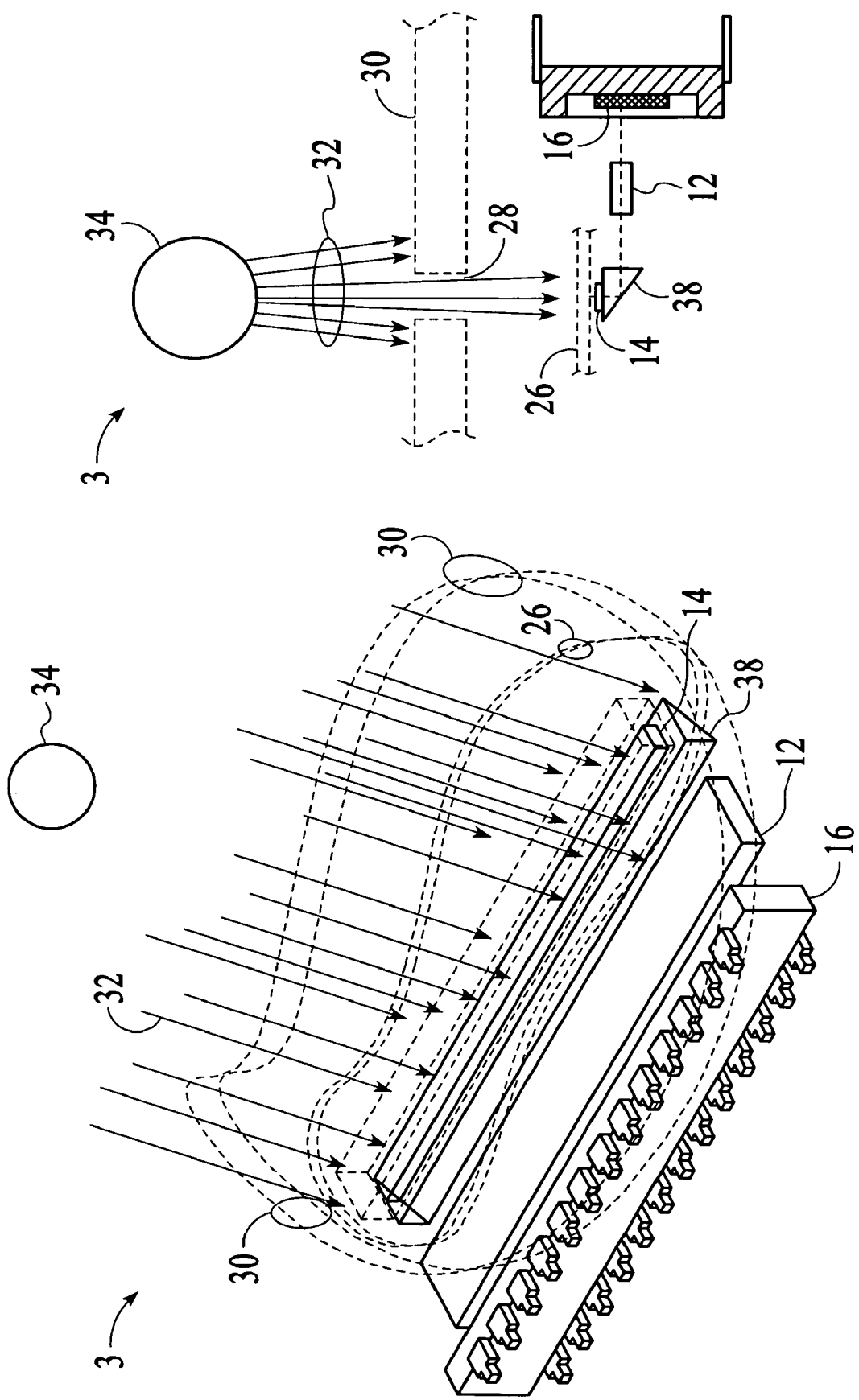

LINEAR X-RAY DETECTOR USING ROD LENS ARRAY

BACKGROUND OF THE INVENTION

1. Field of the Invention

The present invention pertains generally to the field of solid-state X-ray imagers and displays, and more particularly is an improved method that structurally alters the optical path to reduce or avoid radiation damage to the semiconductor components used to process the detected X-ray images.

2. Background of the Invention

Since few X-rays with energies exceeding 10 KeV are captured by semiconductor-based image sensor arrays (Si, Ge, etc.), the X-ray energies must be converted into a detectable form. The image sensor arrays are processed on silicon and are only sensitive to light with wavelengths at or near the visible spectrum. Therefore, the arrays require an X-ray-to-visible-light converter in order to detect the X-rays. To this end, X-ray sensitive scintillating materials, such as the $Gd_2O_2S{:}Tb$ (GOS or GADOX), CsI(TI) or $CdWO_4$ have been used. These materials greatly enhance the detection efficiency of higher energy X-rays in silicon based sensor arrays through the ability of the scintillating materials to scintillate and emit visible light photons proportional to the X-ray energy. The visible light photons are converted to electrical signals by a silicon based image sensor array, such as a Linear Photodiode Array (PDA). When the image sensor array is read out, the array sequentially produces a stream of electrical video signals from each photo-element with amplitudes proportional to the intensity of the X-ray pattern that impinges on the photo-elements.

However, a problem arises in that the scintillation layer on top of the silicon photo-elements will not absorb the X-ray photons completely. Some portion of the X-ray particles penetrates the scintillation layer and is captured by the image sensor array structure, causing irreversible radiation damage to the image sensor array. Therefore, if the image sensor array used in the X-ray imaging system lies in the X-ray path and is not isolated or protected from X-ray exposure, radiation damage will be inflicted on the silicon image sensor array. As a result, the silicon array used in an X-ray imaging system has a limited useful life time.

FIG. 1 is a simplified electrical block diagram describing the signal processing required for an X-ray detector system. Since the present invention involves only the optical and mechanical structures of such systems, the generalized electrical block diagram shown in FIG. 1 is demonstrative of the signal processing circuitry used in all the systems described herein.

In FIG. 1, the detector is a CMOS device with an image sensor array, a PDA, and the readout control circuits for the array. As is known in the art, the PDA is an array of photodiodes with on-chip control circuits for scanning and reading out video signals. In FIG. 1, the PDA is shown with two rows of photodiodes (PD), Row A and Row B. Row A is a dummy row of dark photodiodes used as a reference to differentially cancel any common mode noise from the active video signal, Row B. Row A is covered with metal to shield the photodiodes from light exposure.

Row B has a light sensing area exposed through a narrow slit in the metal to form a narrow aperture over the length of its read line. When the active photodiodes are exposed to imaging light, each diode collects the photons in the immediate area and converts them to signal charges. The signal charges are stored in the depletion layer capacitance of each individual photodiode. The stored charges are read out during the scanning readout process of the PDA. During one line-scan time, which is known as the integration time, each photodiode goes through an integration process. In integration process, each photodiode is read out and then reset to its initial condition to start collecting photons and converting them to charges for the following line-scan time. Since the readout is sequential, while the PDA is continuously scanning, each photodiode sequentially goes through the photon collection (integration) process during one line-scan time.

The scanning process is initiated by a start pulse, SP. Since the integration time is equal to the line-scan time, the line rate of the video signal is determined by the time required to generate the start pulse, which initiates the scanning of the shift register, SR. As the SR shifts a pulse through its register, two rows of MOS switches, SW, that are in series with the PD are accessed. The pulse from the SR closes two switches. One switch is on the dummy video line, VLD, and the other switch is on the active video line, VLA. As the pulse from the SR accesses the SW, the charges from the accessed PD flows out on to the VLA. The photon converted charges are sent to the signal processing circuit, VP, where the charges are differentially added to the reference charges from the VLD, digitized, and stored for the host computer to perform image processing.

To form a Direct Coupled X-ray Detector, a uniform layer of the scintillation material, SCIN, is deposited directly on the sensing areas of the PDA, or a uniform layer of the scintillating material is placed directly on top of the sensing areas of the PDA. The shaded area with diagonal lines in FIG. 1 shows a SCIN layer that has been deposited over the active PD. SCIN is a uniform coated layer that emits photons when its atoms are excited by the impinging beams of the X-ray. The light energies, proportional to the intensity of the X-ray beams, directly expose the active sensing areas of the image sensors and are processed as describe above.

FIGS. 2a-b show the optical and mechanical components of one of the current art X-ray detector systems commonly used today, a Direct Coupled Detector System. This system is the least complicated in terms of fabrication and applications, and therefore results in lower cost than other systems. The details of the drawing are limited to components relevant to the present invention.

FIG. 2a shows an isometric view of the components: the image sensors (IS), the test specimen (TS), the exposing X-ray beam (XPXB), etc. FIG. 2b is a sectional view. In FIGS. 2a-b, the PDA; the test specimen under X-ray imaging (TS); the exposing X-ray beam (XPXB); and the scintillation coating (SCIN) on the sensor die are depicted to show the geometrical relationship among the components involved in X-ray testing of the test specimen, TS.

In operation, the X-ray source emanates the exposing X-ray beam and exposes the test specimen. The X-ray flux patterns are modulated by the specimen under test as the flux pattern passes onto the surface of the scintillation coating. Since the scintillation coating is coated directly onto the surface of the image sensor, the converted light energies proportional to the X-ray flux patterns are integrated by the image sensor array as it generates the image video signals.

The Direct Coupled Detector System in FIG. 2 shows that the exposing X-ray beam passes through the test specimen, the scintillating layer, and the image sensor array. Accordingly the image sensor array receives that portion of the X-ray flux which is not absorbed by the scintillation layer, causing radiation damage on the silicon sensor. In many applications this radiation exposure is intolerable because it drastically reduces the lifetime of the image sensor array, thereby requiring continual replacement and maintenance of the X-ray imaging system.

Although applying the scintillating layer directly to the image sensor is intolerable for many applications, the primary advantages of the method arise from its simplicity in structure and the close proximity of the scintillating layer to the image sensor array, which improves imaging resolution. Among the advantages of this system are that the detectors are simple to fabricate, i.e., the detectors can be fabricated by simply applying a SCIN coating process to existing image array sensors, such as the PDA. This is a great advantage in applications where a shorter lifetime X-ray detector system is required, for example, in destructive testing where the measuring equipment is also destroyed.

Another advantage of a direct coupled detector system arises from the close proximity of the scintillation layer and the photo-element. Since the scintillating coating is in contact with the image plane of the image sensor array, there is little or essentially no space between them. This close proximity gives the detector the ability to retain its optimum resolution and Modulation Transfer Function (MTF).

Another advantage of the system, arising from the close proximity of the PDA and the scintillating layer, is the light coupling efficiency, i.e., there is very little light energy loss in the transmission between the PDA and the scintillating layer. Another advantage, which arises from its simple structure, is that the system can be implemented in a small enclosure. The ability to use the system in a small enclosure also allows the system to be designed as a portable unit.

However, there are also several drawbacks to the Direct Coupled Detector System. The system user must tolerate a shorter lifetime for the X-ray detector system in a given application, and the PDA must be continually replaced. The Direct Coupled Detector System has a high maintenance cost, requires intensive labor, and requires a significant amount of down time.

In addition to the high operating cost of the system, a major disadvantage stems from the properties of semiconductors in general. Not only are image sensors subject to radiation damages, but all semiconductors, to various degrees, are susceptible to damage from X-ray exposure. Some devices are processed for radiation tolerance that provides some degree of protection and increases the life times of the devices for operations under X-ray exposure. This process is very expensive, and can not render the devices completely immune to radiation damage. Accordingly, in an open unprotected X-ray system, such as the Direct Coupled Detector System, all of the semiconductors in the system are susceptible to radiation damage.

Another disadvantage of the Direct Coupled Detector System arises from the noise properties of the PDA. Sensor noise increases with an increasing number of radiation exposures due to the build-up of undesirable charges in the oxide and silicon interface. Therefore, as the system is used, the noise level increases to an intolerable level, and eventually the image sensor (PDA) must be replaced. Since noise build-up is a function of radiation exposure, depending on the specified signal-to-noise ratio in a given system, the noise build-up may be the limiting factor as opposed to overall functional degradation, i.e., the noise build-up may limit the detector system life time more than the overall device functionality.

A third disadvantage of the Direct Coupled Detector System is that the leakage current of the image sensor increases as the interface charge builds up during operation under X-ray exposure. As the leakage current increases, the storage space in the photodiode is decreased until it is rendered unusable. If a large dynamic range is desired in the subject system, the leakage current build-up will limit the usable lifetime of the sensor.

A fourth disadvantage in the current art Direct Coupled Detector System is that when some of the X-ray photons pass through the scintillation layer and are absorbed by the photodiode, large signal spikes are created that increase the noise level of the video signal.

A fifth disadvantage of the Direct Coupled Detector System is that the scintillating materials commonly used, $Gd_2O_2S:Tb$ (GOS or GADOX), CsI(Tl) and $CdWO_4$, are not easily interchangeable if users want to swap among them in order to detect X-rays with different energy ranges.

A second prior art system, the Fiber Optics Coupled Detector System, employs a fiber optics bundle to transmit the light from the scintillating layer to the PDA. The object of this system is to isolate the PDA and its electronic components from the exposing X-ray beam. FIGS. 3a-b summarize the optical-mechanical configuration of a Fiber Optics Coupled Detector System. The components of the system are an X-ray source (XS); an exposing X-ray beam (XPXB); a lead shield (LS) with the slit to form an aperture (AP); a test specimen (TS) undergoing X-ray examination; scintillating layer (SCIN) that is coated onto the surface of an optical flat transparent transmission plate (OTP); an image sensor DIP package (PDA); a fiber optic bond (FB); a fiber optic bundle (OF); and an image sensor (IS). The X-ray-to-light converter assembly (ASY) represents the assembly of the scintillating layer, the optical transmission plate, and the fiber optic bond.

The X-ray source passes through the aperture, the slit in the lead shield, to limit the area of the X-ray beam exposure to the neighborhood of the X-ray-to-light converter assembly. The X-ray-to-light converter assembly converts the modulated X-ray flux densities, proportional to the density patterns in the test specimen, to proportional light intensities. The light intensities are coupled into the fiber optic bundle through the fiber bond. The fiber optic bundle couples the light flux down to and through a second fiber bond that couples the light flux onto the surface of the image sensor, where the light flux is integrated and processed. The fiber optic transmission line gives the detector the ability to remotely place the X-ray-to-light converter assembly, hence isolating the PDA and its associated electronic circuits from the path of the exposing X-ray beam, thereby giving the X-ray detector system the advantage of protection of the radiation sensitive components. Remotely locating the X-ray detector assembly from the electronic assembly separates the optical path from the X-ray path and achieves the objective of protecting the electronic circuit components from radiation damage.

A second advantage of the Fiber Optics Coupled Detector System is the preservation of the resolution. A fiber optic bundle has a relatively high optical resolution. However, the fiber optic bundle does create a disadvantage for the system in that glass fiber bundles are expensive and difficult to fabricate.

A second disadvantage of the fiber optics system is the difficulty of assembly. The glass bundles are difficult to mount and bond. They must be critically aligned and bonded to their transmitting and receiving components to avoid undue optical transmission losses. The alignment constraint is even greater in the case of bonding the fiber optic ends to the surface of the elements of an image sensor because the fiber ends must be cut to exactly match the surface of the image array elements.

A third disadvantage of the Fiber Optics Coupled Detector System is the constraints imposed on the design of the enclosure. The complicated methods used in bonding and mounting the fiber optic bundle require supporting structures within the enclosure. The supporting structure, which needs to be flexible enough to make initial adjustments, must also serve as a rigid mount to ensure that the bonded ends remain stationary in transportation and operation. Especially critical in adjusting and mounting are the contacts between the scintillating layer and the optical flat transparent transmission plate and at the fiber bond on the image sensor surfaces. The degree of careful handling required becomes even greater in a two-dimensional application of this X-ray system.

A fourth disadvantage of the Fiber Optics Coupled Detector System is that the scintillating materials of $Gd_2O_2S:Tb$ (GOS or GADOX), CsI(TI) or $CdWO_4$ are not easily interchangeable if users want to swap among them in order to detect X-rays with a different energy range.

Accordingly, it is an object of the present invention to provide an X-ray detector system that is long life, compact, and low cost, and that has a simple mechanical structure that lends itself to simple production assembly with minimal requirements for alignment, adjustment and calibration testing.

Another object of the present invention is to reduce X-ray exposure on components which are sensitive to radiation damage by completely isolating or shielding the components in the detector system from X-ray exposure.

SUMMARY OF THE INVENTION

It is well known that X-rays cannot be focused, and can only be controlled with a shield (typically formed from lead) with aperture stops. This is why X-rays require one-to-one imaging, and why the scintillating layer needs to be in direct contact with the image sensor in the prior art systems described above. A key feature of the present invention is the utilization of the one-to-one imaging characteristics of a rod lens array to maintain the resolution in the X-ray detector system while allowing flexibility in designing the image capture optical path.

The present invention is a radiation damage resistant linear X-ray detector array system. The detector array system is based on a unique focusing principle using the rod lens array. The system includes a layer of scintillating material, the rod lens array, and an array of image sensors. Some of the viable options for the scintillating material are $Gd_2O_2S:Tb$ (GOS or GADOX), CsI(TI), and $CdWO_4$. The layer of scintillating material is placed on an image plane and is used to convert the impinging X-ray energies into visible light which can be detected efficiently by the image sensor array. The rod lens array is used to focus the visible light after the X-ray flux has been converted. The photon energy of the visible light is collected with a scanning image sensor array that converts the photon energy proportionally into electrical video signals and enables it to be processed using standard signal and image processing software and equipment.

Utilization of the rod lens array enables the user of the present invention to isolate or shield the radiation sensitive semiconductor components from X-ray exposure in an X-ray detector system.

Another advantage of using the rod lens array in an X-ray detector system is its physical structure. The rod lens array is a single solid piece with an array of optical transmission rods with fixed focus. This enables the rod lens array to be easily installed with little or no positional adjustments, thereby yielding an X-ray system that can be easily implemented with little or no optical adjustments, as opposed to the many adjustments required for a Fiber Optical Coupled System.

Still another advantage of the present invention is that the existing low-cost and high-volume production of the rod lens arrays allows the X-ray Detector Machines according to the present invention to also be produced at low cost and high volume.

Another advantage obtained by using a rod lens in the system is the ability to focus the images from the scintillating layer to the PDA, hence providing a means to alter and modify the optical path while preserving high resolution, i.e., the MTF, modulation transfer function.

Still another advantage is that the present invention provides low-cost and simple methods of suppressing or attenuating the exposing X-ray beam to shield the radiation sensitive components of the system.

Another advantage of the present invention is that it makes it possible to manufacture a small, portable X-ray Detector Machine.

Yet another advantage of the present invention is that with the small enclosure size required and the methods of radiation shielding, it is possible to design Dual or Multi X-ray Scanning Machines enclosed in the same space currently used to enclose a Single X-ray Scanning Machine. The Dual or Multi X-ray Scanning Machines can be used for scanning a target simultaneously in different X-ray energy ranges for better detection.

Still another advantage arising from the small size and shielding properties of the present invention is that it is possible to implement a three-dimensional X-ray scanner, in which two scanning detectors system are positioned orthogonally with respect to each other.

Another advantage arises from the focusing ability of the rod lens array. The rod lens array has a resolution capability much higher than that of the scintillating material, and therefore is not the limiting factor in the system resolution. Another advantage, arising from the direct focusing of the system is that it keeps light energy loss to a minimum. The only losses are the transmission attenuation of the rod lens and the transmission loss through the optical transmission plate.

One additional advantage is that the scintillating materials utilized, $Gd_2O_2S:Tb$ (GOS or GADOX), CsI(TI) and $CdWO_4$ are easily interchangeable if users want to swap among them in order to implement X-ray detection with a different energy range.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIG. 2a is an isometric view of the system, and FIG. 2b is a sectional view.

FIGS. 3a-b illustrate the optical-mechanical configuration of a second prior art system, a Fiber Optics Coupled Detector System. FIG. 3a is an isometric view of the system, and FIG. 3b is a sectional view.

FIG. 4a is an isometric view of the array, and FIG. 4b is a sectional view.

FIG. 5a is an isometric view of the system, and FIG. 5b is a sectional view.

FIGS. 7a-b illustrate an application of the present invention that separates the optical path of the system from the X-ray path to isolate the X-ray radiation from the radiation sensitive areas in the system. FIG. 7a is an isometric view of the system, and FIG. 7b is a sectional view.

DETAILED DESCRIPTION OF THE PRESENT INVENTION

Figure 1:
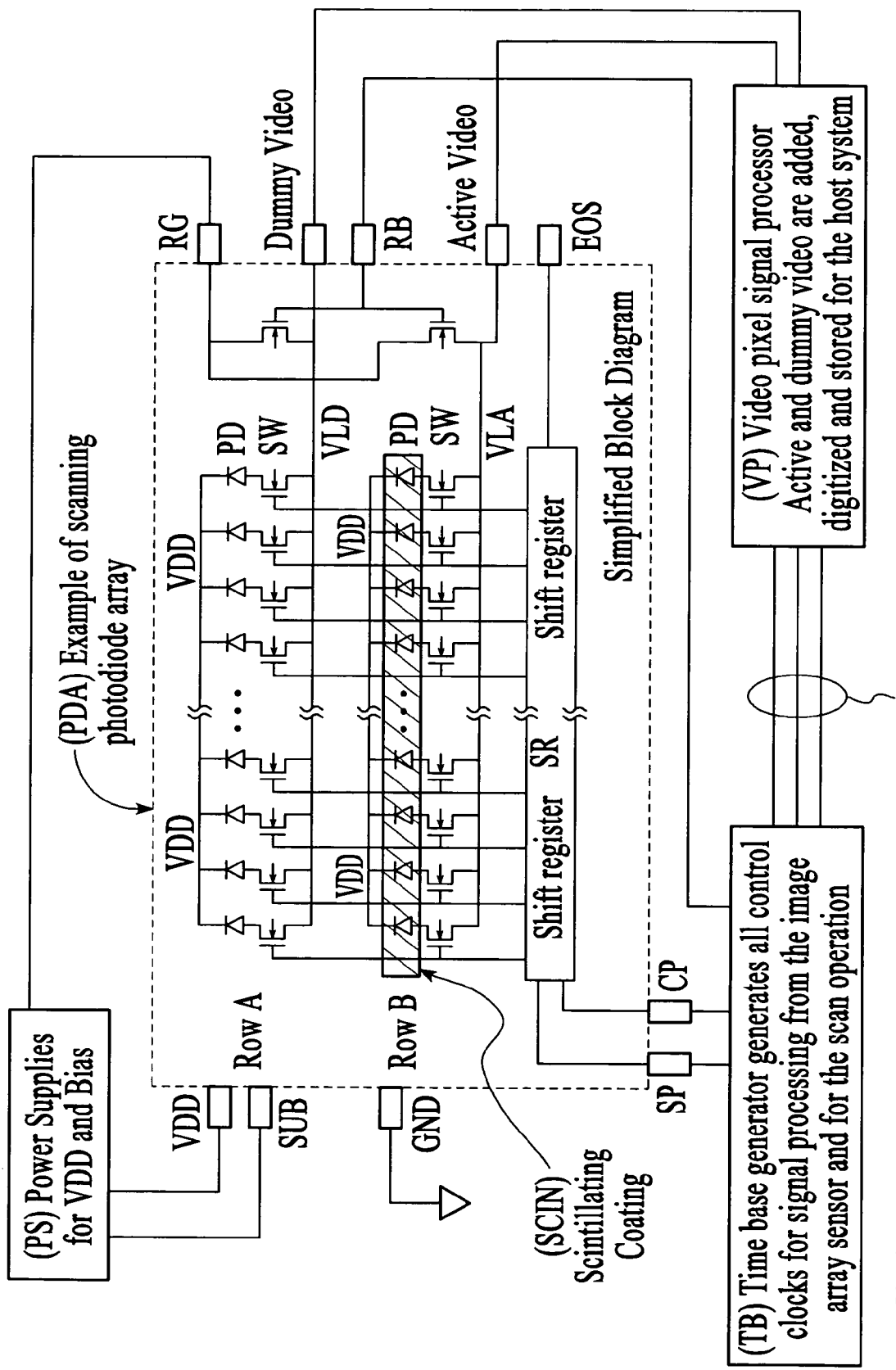
FIG. 1 illustrates a simplified electrical block diagram of a prior art Direct Coupled Detector System.
Figure 2A:
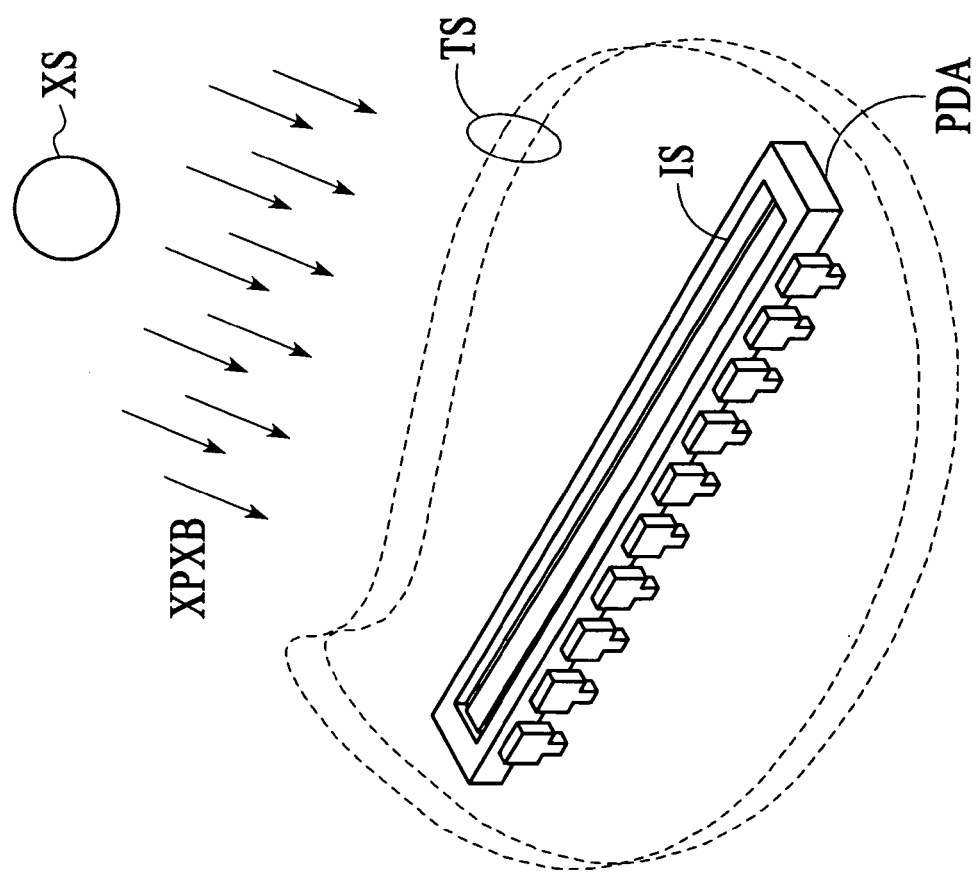
FIGS. 2a-b show the optical-mechanical configuration of a prior art Direct Coupled Detector System.
Figure 2B:
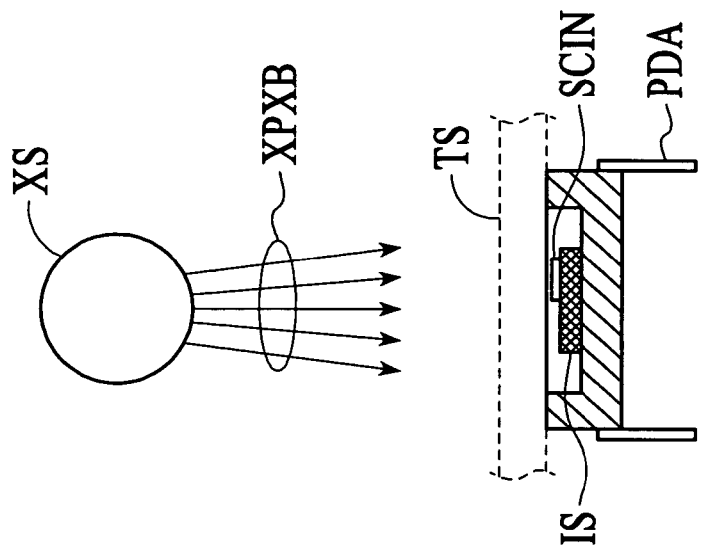
Figures 4A, 4B:
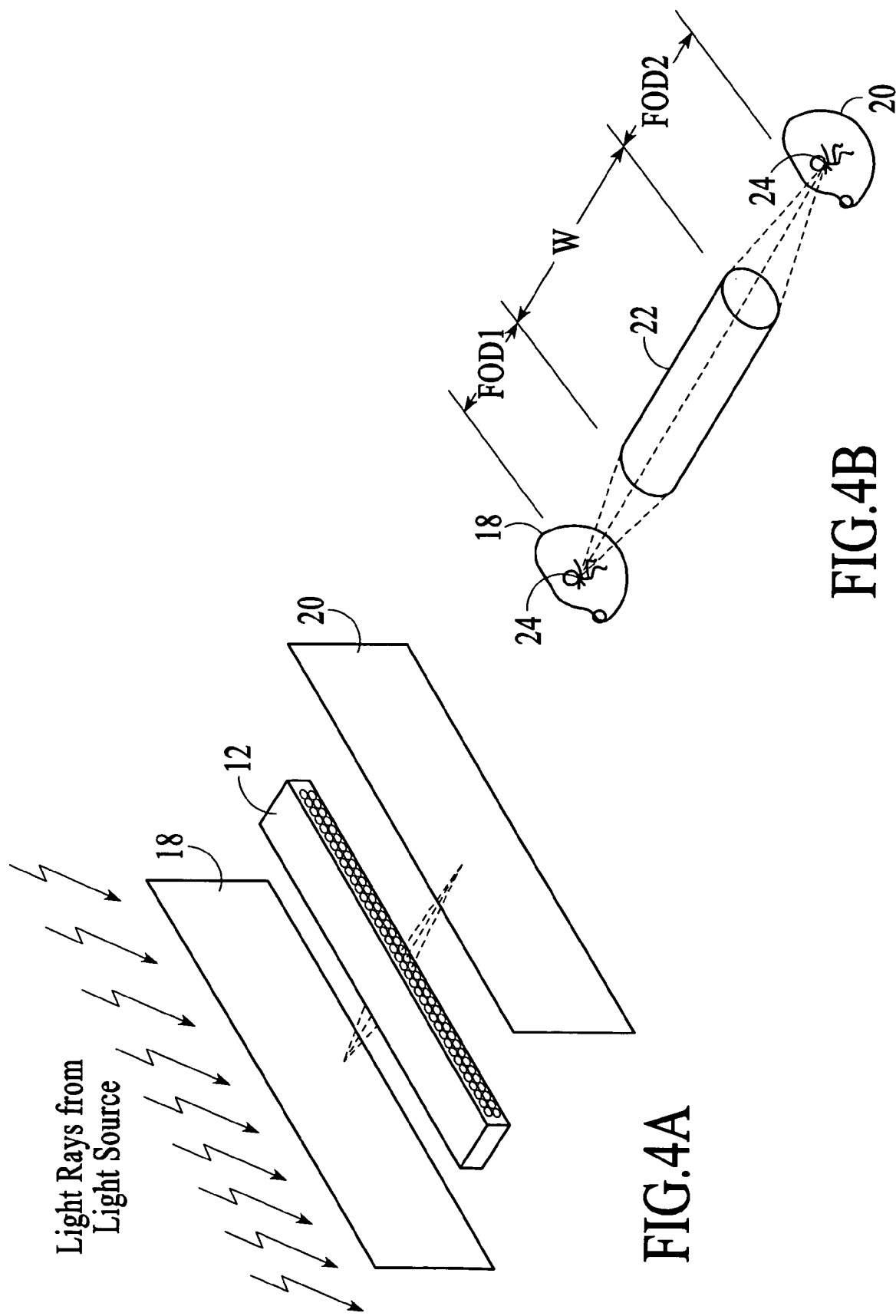
FIGS. 4a-b illustrate the rod lens array used in the present invention.

The present invention is a linear X-ray detector system 1. The detector system 1 is based on a unique focusing principle that utilizes a rod lens array 12, as illustrated in FIGS. 4a-b. The rod lens array 12 is installed in the system 10 as illustrated in FIGS. 5-11. The detector system 1 comprises a layer of scintillating material 14, the rod lens array 12, and an array of image sensors 16.

Some of the viable options for the scintillating material layer 14 are $Gd_2O_2S$:Tb (GOS or GADOX), CsI(Tl), and $CdWO_4$. As described more fully below, the layer of scintillating material 14 is placed on an image plane and is used to convert the impinging X-ray energies into visible light which can be detected efficiently by the image sensor array 16.

FIGS. 4a-b summarize the structure of the rod lens array 12 used in the detector system 1 of the present invention. Rod lens arrays are available in single and dual row arrays. In FIG. 4a, the rod lens array 12 is depicted as a dual row array. Light rays from a light source illuminate the object image plane 18. The rod lens array 12 is located between the object image plane 18 and the image plane 20. The broken lines represent the light rays emanating from a single element on the object image plane 18, passing through the rod lens array 12, and focusing onto the image plane 20.

FIG. 4b shows a single rod 22 from the dual row lens array 12 to illustrate the properties of the single rod 22. The single rod lens 22 has a positive one-to-one focus property. The rod lens 22 takes an illuminated point along a focusing path on the object image plane 18 in X-Y coordinates and focuses the point onto the image plane 20 with X-Y coordinates identical to those on the object image plane 18. Through this process, an exact replica of the image 24 that is illuminated on the object image plane 18 is focused through the rod lens array 12 and then projected onto the image plane 20.

The total focus distance between the two image planes 18, 20 varies with the size of the rod lens array 12. The focus distance is the sum of the rod lens width, W, and the two focus distances, FOD1 and FOD2, between the rod lens 22 and the image planes 18, 20. Since the rod lens arrays 12 are utilized in a one-to-one imaging application in the present invention, each rod lens 22 must be manufactured so that FOD1 is equal to FOD2.

A property of the rod lens 22 that proves to be a great advantage in the present invention is the preservation of the MTF, Modulation Transfer Function. MTF is a means of measuring the resolution of an optical system. The highest resolving power of a high density rod lens array has a resolution in excess of 90 LP/mm (2400 DPI is equivalent to 94 LP/mm). One of the better quality X-ray scintillating materials, Lanex $Gd_2O_2S$:Tb, has a resolution of 14 LP/mm. Comparison of these resolutions shows that generally the resolution of the X-ray scintillating material is the limiting factor in the optical path when rod lens arrays are used as the focusing medium.

Figure 5A:
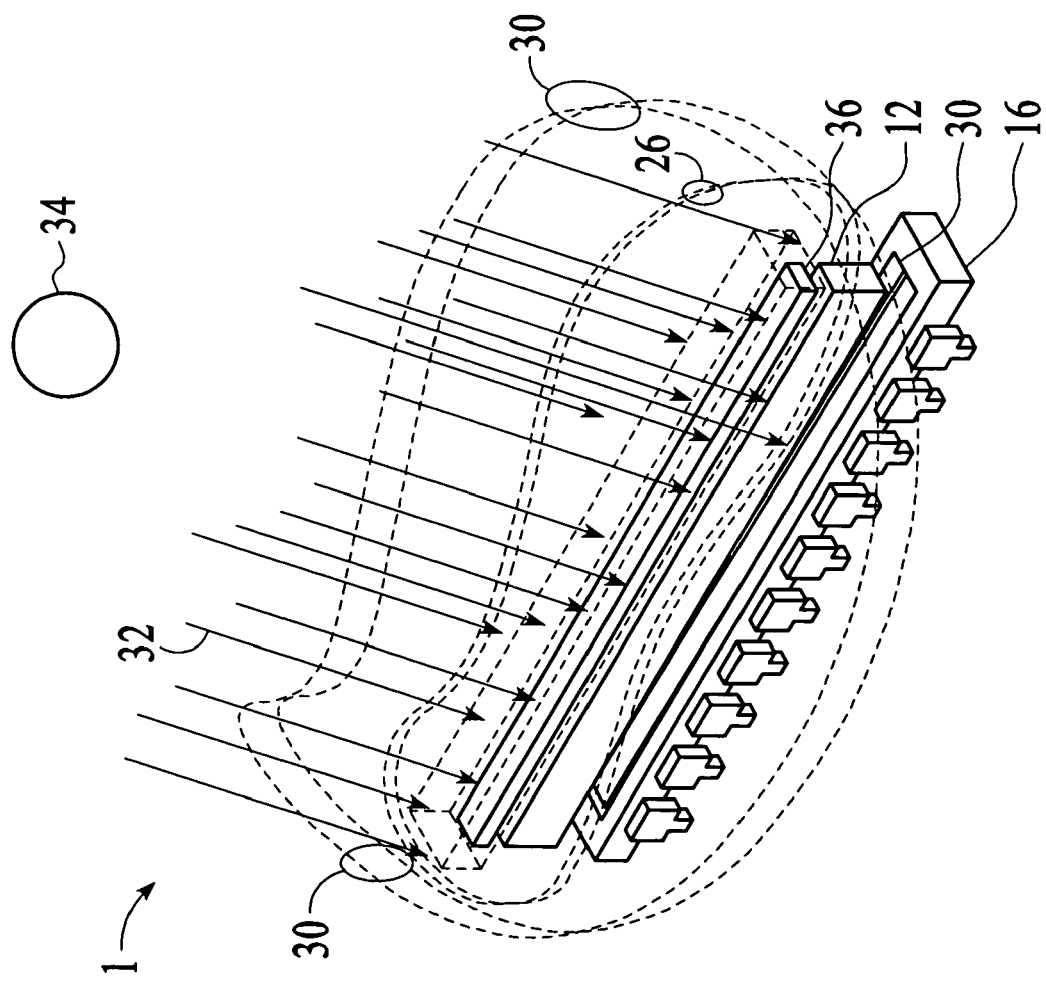
FIGS. 5a-b show an X-ray detector system with intensity suppressor means that absorb and attenuate the X-ray radiation while transmitting the optical light energies.
Figure 5B:
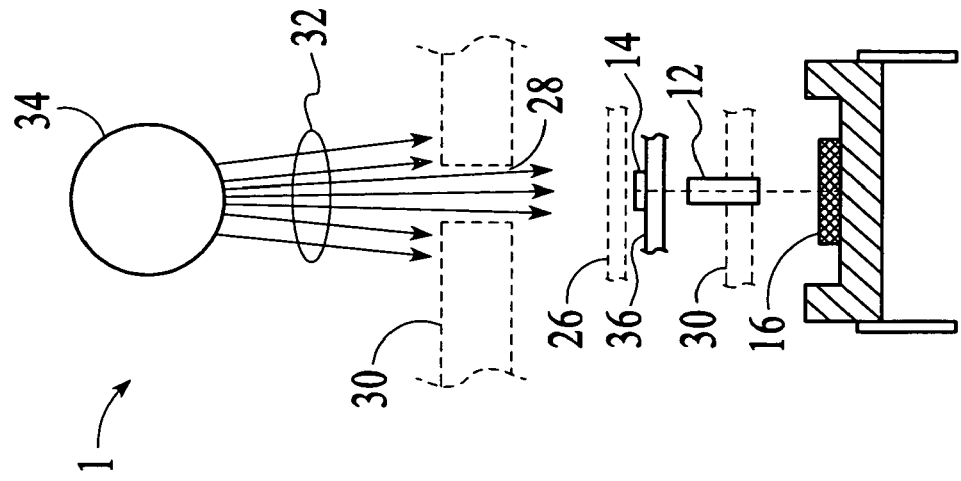

Referring now to FIGS. 5a-b, the rod lens array 12 is positioned between the object image plane, which is the optically scintillating material layer 14, and the sensor image plane 20 to focus the optical image from the scintillating material layer 14 to the image sensor array 16. By using the low-cost rod lens array 12, which is available in many configurations that provide different aperture sizes and focal distances, the imaging optical path can be very simply altered or modified. The capability of altering the optical path allows shielding and isolation of the image sensor array 16 and supporting electronics of the system 1 from X-ray damage.

The X-ray detector system 1 employs the rod lens array 12 to couple an image from a test specimen from the scintillating material layer 14 to the image sensor array 16. The exposing X-ray beam 32 passes through an aperture 28 in a first lead shield 30. The aperture 28 limits the flux area of the exposing X-ray beam 32 so that the flux is confined to the vicinity of the testing area on the test specimen 26. The confined exposing X-ray beam 32 freely passes through the test specimen 26 and excites the scintillating material layer 14 proportionally to the X-ray density patterns of the test specimen 26. The converted optical image on the scintillating material layer 14 surface is directly focused by the rod lens array 12 onto the image sensor array 16.

In the application illustrated in FIGS. 5a-b, the optical path is in parallel with the exposing X-ray beam 32, but the intensity of the exposing X-ray beam 32 is heavily attenuated after it passes through the structures of both the scintillating material layer 14 and the rod lens array 12. A second lead shield 30 with aperture 28 surrounds the rod lens array 12. The aperture 28 in the second lead shield 30 is made just wide enough to accept the rod lens array 12, so that the second lead shield 30 provides additional shielding from the scattered residual X-ray flux that passed through the first aperture 28. This constrains the exposing X-ray beam 32 radiating area to a size just large enough to match the test specimen 26 testing area. The exposing X-ray beam 32 emanating from the X-ray source 34 and the associated scattered X-ray energies are therefore shielded by the two lead shields 30 from entry into the radiation critical areas of the detector system 1.

The scintillating material layer 14 is positioned directly on an optical transmission plate 36. The optical transmission plate 36 comprises a heavy element, such as lead, as in a lead optical glass plate. Since the scintillating material layer 14 is positioned directly on an optical transmission plate 36, the light rays generated by the scintillating material layer 14 when excited by the exposing X-ray beam 32 emanate directly into the optical transmission plate 36. In that the optical transmission plate 36 includes a heavy element such as lead, the optical transmission plate 36 significantly attenuates the remaining exposing X-ray beam 32 and passes minimal harmful residual X-ray energies. This greatly reduces any harmful effects of the exposing X-ray beam 32 on any of the radiation sensitive components in the system 1. However, the light rays from the scintillating material 14 pass freely into the rod lens array 12.

The optical image from the scintillating material layer 14 that has passed through the optical transmission plate 36 is directly focused with a high transferring efficiency by the rod lens array 12 and projected onto the image sensor array 16. It should be noted that the rod lens array 12 is made of optical fiber, so that the body of the lens array 12 also attenuates the residual X-ray energy.

Since the rod lens array 12 is required to have FOD1 equal to FOD2 to maintain the optimum focus, the optical index of the optical transmission plate 36 must be included in calculating the effective focal length, FOD1, of the rod lens array 12. Accordingly, the optical properties of the optical transmission plate 36 must be considered in the calculation of the effective focal length, FOD1. This corrected effective optical path, starting from the scintillating material layer 14 through the rod lens array 12 to the surface of the image sensor array 16 maintains the MTF properties of the system 1, so that the resolution of the system 1 is limited by the material chosen for the scintillating layer 14.

Furthermore since the width, W, of the rod lens array 12 can exceed 25 mm, the rod lens array 12 aids in attenuating the residual exposing X-ray beam 32 and contributes significantly to the protection aspect of the system 1.

Figure 6:
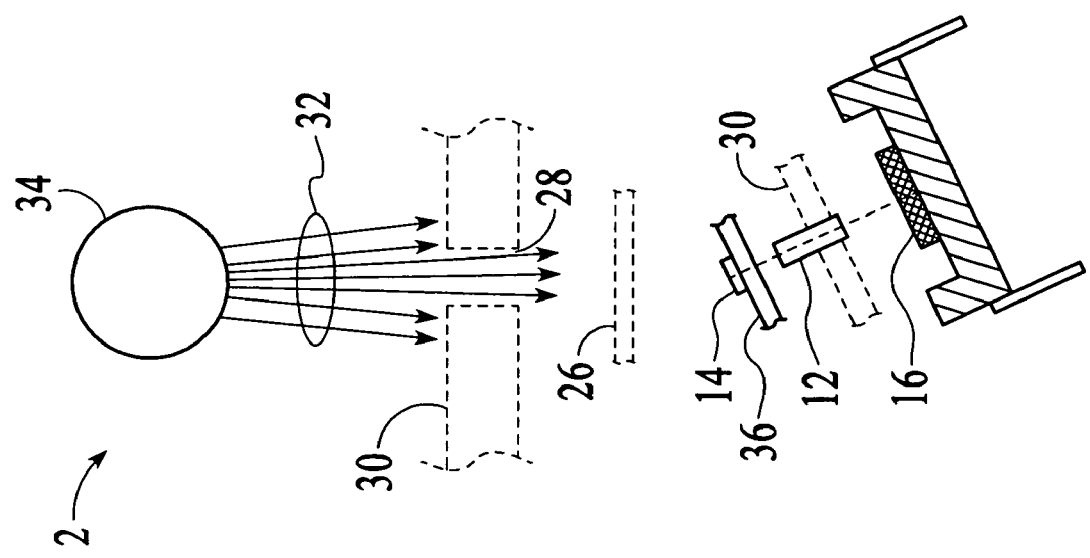
FIG. 6 shows an application in which the detection elements of the system are rotated slightly to allow the image sensor array to be removed from the X-ray flux path.

FIG. 6 shows a modified implementation of the X-ray detector system 2. In this application, the detection elements of the system 2—the scintillating material layer 14, the optical transmission plate 36, the rod lens array 12, and the image sensor array 16—are rotated through a small angle relative to the exposing X-ray beam 32 flux path. This orientation allows the image sensor array 16 to be positioned out of the X-ray flux path. As a result, the image sensor array 16 is free from direct radiation exposure while maintaining the advantages of the detector system. Furthermore, the tilted scintillating material layer 14 has slightly more X-ray stopping power and generates slightly more visible light. Therefore light intensity loss in the scintillating material layer 14 due to spread of the projection area can be partially compensated for. There is no longitudinal image distortion in this configuration and thus the linear resolution of the system will be maintained.

FIGS. 7a-b show an implementation of the X-ray detector system 3 in which the optical and X-ray paths of the detector system 3 are separated to isolate the radiation sensitive components of the system 3 from the X-ray flux path. The detector system 3 provides complete isolation between the optical path and the exposing X-ray beam 32 flux path by employing an optical path reflector 38 in place of the optical transmission plate to modify the optical path of the system 3.

In this embodiment of the detector system, the scintillating material layer 14 is applied directly to the upstream surface of the optical path reflector 38. In the preferred embodiment illustrated in FIGS. 7a-b, the optical path reflector 38 is a right triangular prism. The length of the optical path reflector 38 is slightly greater than the length of the image sensor array 16. The hypotenuse side of the optical path reflector 38 is coated with a reflecting medium to form a mirror. The focus distance of the rod lens array 12 from the scintillating material layer coating 14 must include the 90° path through the optical path reflector 38 that reflects the radiating light at a right angle to the exposing X-ray beam 32 path. Accordingly the optical path bends 90° relative to the longitudinal axis of the exposing X-ray beam 32 path. This separation of the optical path from the X-ray flux path isolates the exposing X-ray beam 32 from all of the components of the system 3 that are sensitive to X-ray radiation. It should be recognized that reflective angles other than 90° can be utilized, but may result in increased assembly and operation complexity.

Figure 8:
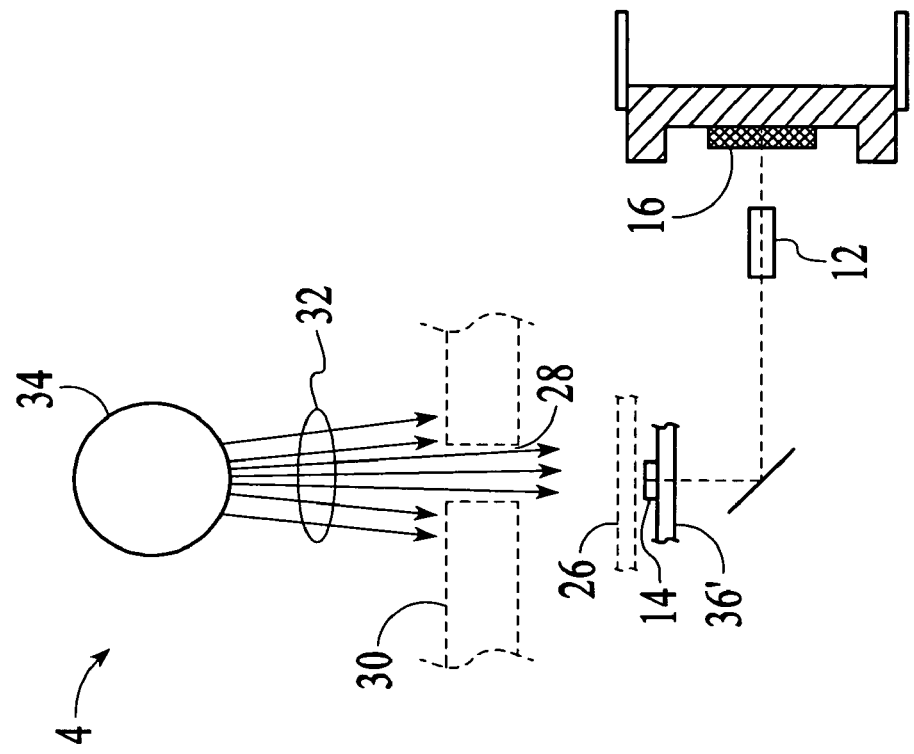
FIG. 8 illustrates an application of the detector system in which the optical path is reflected 90° using a mirror.

FIG. 8 shows another configuration for the separated paths implementation of the present invention. In this embodiment, X-ray detector system 4, after the light emitted from the scintillating material layer 14 passes through an optical transmission plate 36', the light beam is bent by the optical path reflector 38'. In detector system 4, the optical path reflector 38' is a mirror. The light beam is then focused by the rod lens array 12, and finally reaches the image sensor array 16. The optical transmission plate 36' can be just normal optical glass or even plastic with a high transferring efficiency.

Figure 9:
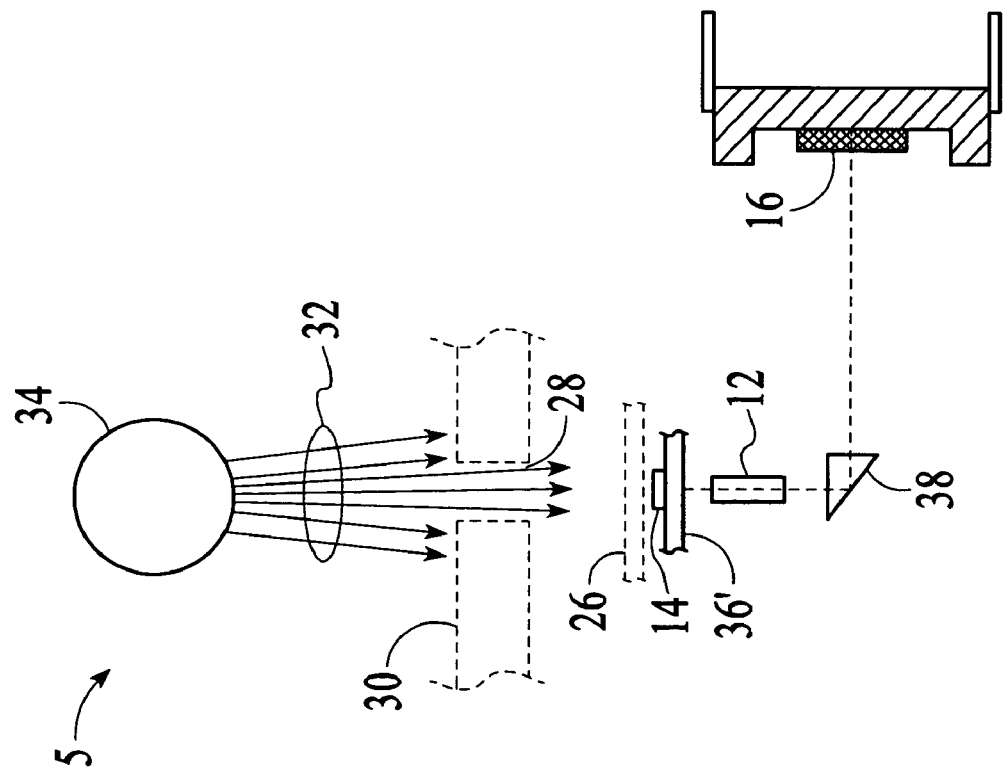
FIG. 9 illustrates an application of the detector system in which the optical path is reflected 90° using a different reflecting element.

FIG. 9 shows still another implementation of the present invention, an X-ray detector system 5. In this embodiment, the optical path reflector 38 (a prism) is positioned downstream of the rod lens array 12. The focused light from the rod lens array 12 is directed by the prism 38 to the image sensor array 16.

Figure 10:
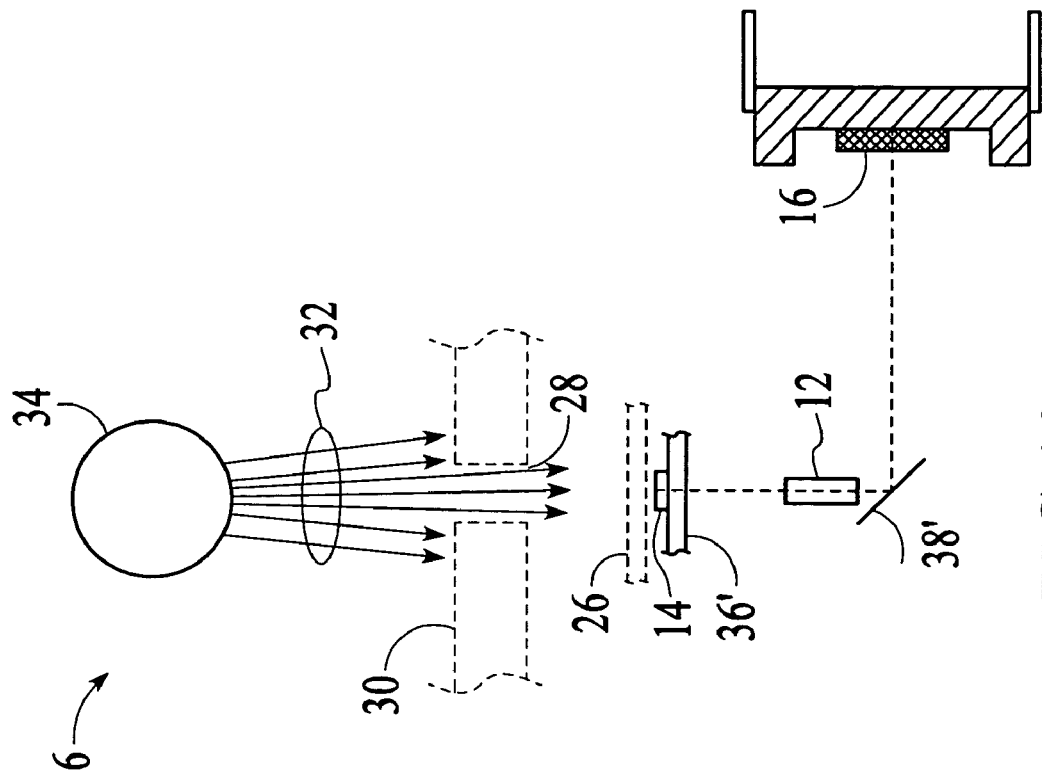
FIG. 10 shows another variation of the detector system using the reflecting element.

FIG. 10 illustrates another X-ray detector system 6 in which a mirror 38' is substituted for the prism 38 as the optical path reflector. Otherwise, system 6 is identical to system 5.

Figure 11:
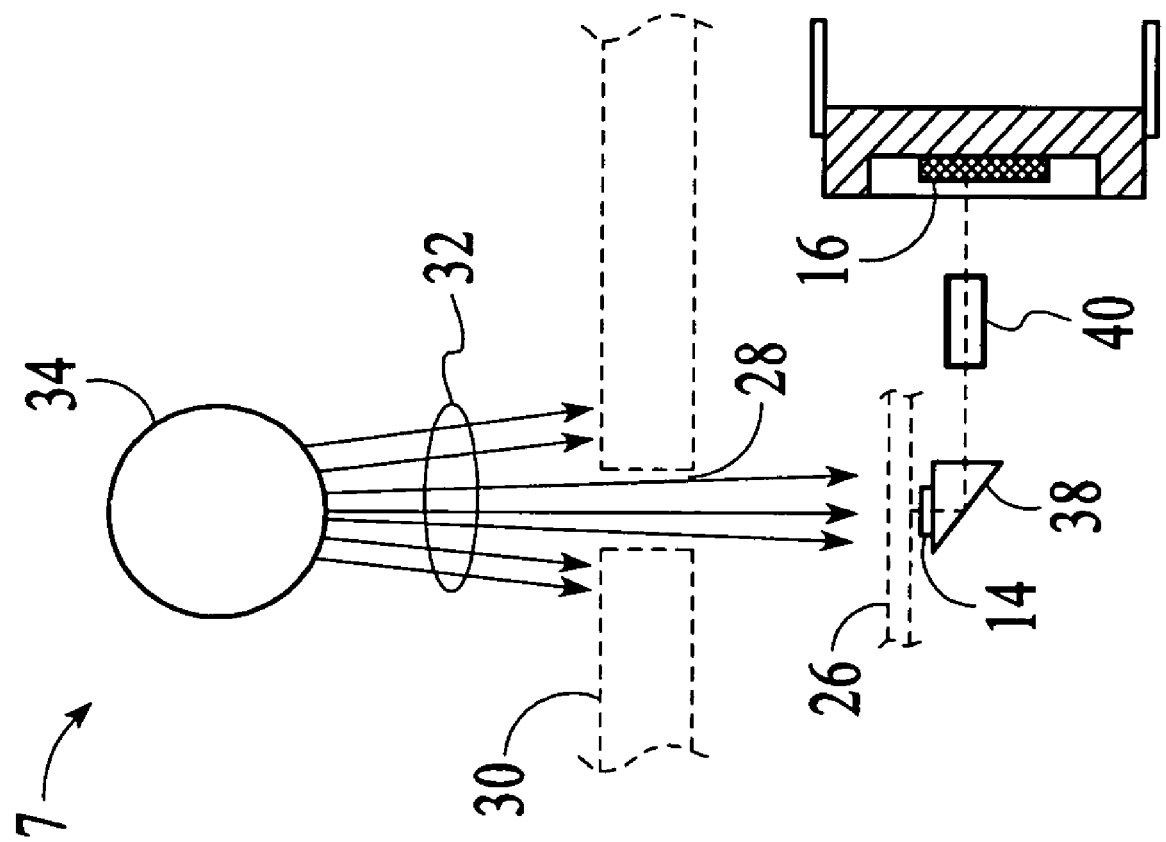
FIG. 11 shows an extreme application in which a long X-ray detector array is used, and in which only a low image resolution is required.

FIG. 11 shows an extreme case for the separated paths implementation of the present invention, X-ray detector system 7. System 7 is utilized in applications in which low resolution is acceptable, and a long image sensor array 16 is required, such as in a container inspection system. In this application, the rod lens array 12 can be omitted to improve the system sensitivity and to reduce cost.

For example, when the detector pixel size is bigger than 3.2 mm×3.2 mm, the inclusion of a rod lens array would become optional. The rod lens array can be replaced by a collimator 40, or the rod lens array can even omitted completely without compromising the resolution of the system. The image sensor array 16 can be positioned closer to the optical path reflector 38 to improve sensitivity, as well as to make the system more compact.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. An X-ray detector system comprising:
   an X-ray source,
   a scintillating material layer deposited on a first surface of a prism,
   a reflective material deposited on a second surface of said prism,
   a rod lens array, and
   an image sensor array; wherein
   when a test specimen is exposed to an X-ray beam from said X-ray source, said X-ray beam passes through the test specimen and excites said scintillating material layer proportionally to X-ray density patterns of the test specimen, and
   light representing a converted optical image from said scintillating material layer is reflected off of said reflective material to said rod lens array, said rod lens array focusing said light onto said image sensor array, a reproduced image of the test specimen thereafter being read out of said image sensor array.

2. The X-ray detector system as defined in claim 1 wherein:
   a lead shield with an aperture therein is positioned between said X-ray source and the test specimen, so that said X-ray beam is confined to an area of the test specimen after passing through said aperture in said lead shield.

3. An X-ray detector system comprising:
   an X-ray source, a scintillating material layer deposited on an optical transmission plate, a mirror, a rod lens array, and an image sensor array; wherein when a test specimen is exposed to an X-ray beam from said X-ray source, said X-ray beam passes through the test specimen and excites said scintillating material layer proportionally to X-ray density patterns of the test specimen, and light representing a converted optical image from said scintillating material layer is reflected off of said mirror to said rod lens array, said rod lens array focusing said light onto said image sensor array, a reproduced image of the test specimen thereafter being read out of said image sensor array.

4. The X-ray detector system as defined in claim 3 wherein: a lead shield with an aperture therein is positioned between said X-ray source and the test specimen, so that said X-ray beam is confined to an area of the test specimen after passing through said aperture in said lead shield.

5. The X-ray detector system as defined in claim 3 wherein: said optical transmission plate comprises optical glass.

6. The X-ray detector system as defined in claim 3 wherein: said optical transmission plate comprises plastic with a high light transferring efficiency.

7. An X-ray detector system comprising:

an X-ray source, a scintillating material layer deposited on an optical transmission plate, an optical path reflector, a rod lens array, and an image sensor array; wherein when a test specimen is exposed to an X-ray beam from said X-ray source, said X-ray beam passes through the test specimen and excites said scintillating material layer proportionally to X-ray density patterns of the test specimen, and light representing a converted optical image from said scintillating material layer is transmitted to said rod lens array, said rod lens array focusing said light, said light then being reflected off of said optical path reflector onto said image sensor array, a reproduced image of the test specimen thereafter being read out of said image sensor array.

8. The X-ray detector system as defined in claim 7 wherein: a lead shield with an aperture therein is positioned between said X-ray source and the test specimen, so that said X-ray beam is confined to an area of the test specimen after passing through said aperture in said lead shield.

9. The X-ray detector system as defined in claim 7 wherein: said optical transmission pin comprises optical glass.

10. The X-ray detector system as defined in claim 7 wherein: said optical transmission pin comprises plastic with a high light transferring efficiency.

11. The X-ray detector system as defined in claim 7 wherein: said optical path reflector is a prism.

12. The X-ray detector system as defined in claim 7 wherein: said optical path reflector is a mirror.

* * * * *